US005187678A

United States Patent [19]

Hori

[11] Patent Number: 5,187,678

[45] Date of Patent: Feb. 16, 1993

[54] PRIORITY ENCODER AND FLOATING-POINT NORMALIZATION SYSTEM FOR IEEE 754 STANDARD

[75] Inventor: Chikahiro Hori, Kanagawa, Japan

[73] Assignee: Kabushiki Kaisha Toshiba, Kawasaki, Japan

[21] Appl. No.: 589,507

[22] Filed: Sep. 28, 1990

[30] Foreign Application Priority Data

Sep. 30, 1989 [JP] Japan ................................ 1-255470

[51] Int. Cl.[5] ................................................ G06F 7/38

[52] U.S. Cl. ................................ 364/748; 364/715.04

[58] Field of Search ............... 314/715.04, 748, 715.08

[56] References Cited

U.S. PATENT DOCUMENTS 4,779,220 10/1988 Nukiyama .................. 364/715.04 X
4,785,421 11/1988 Takahashi et al. ............ 364/715.04
4,794,557 12/1988 Yoshida et al. ............ 364/715.04 X
4,807,172 2/1989 Nukiyama ...................... 364/715.08
4,922,446 5/1990 Zurawski et al. .......... 364/715.04 X
4,947,358 8/1990 Lamere et al. ................ 364/715.04

FOREIGN PATENT DOCUMENTS 60-83139 5/1985 Japan ............................ 364/715.04

*Primary Examiner*—Tan V. Mai
*Attorney, Agent, or Firm*—Foley & Lardner

[57] ABSTRACT

A priority encoder with two inputs, an exponent input and a mantissa input, forming a floating-point number, wherein the priority encoder outputs the smallest value after comparing the two inputs and the output from the priority encoder is input to a substractor and a barrel shifter. The barrel shifter shifts the mantissa input before the completion of the subtract operation. First, the mantissa input is left-shifted by the left barrel shifter under the selection of the selector controlled by the control signal in accordance with the value of the exponent input. The first result from the barrel shifter is stored in the data holding circuit after shifting it to the right by one bit with the right direction 1-bit shifter. Next, the mantissa input is shifted to the left by the left direction barrel shifter. The second result of the barrel shifter is not stored in the data holding circuit. One of the above two results is selected by the selector.

7 Claims, 9 Drawing Sheets

PRIORITY ENCODER
EXPONENT OPERATION
MANTISSA BARREL SHIFTER
OUTPUT
OPERATION
OUTPUT
m
OPERATION
OUTPUT
n-1 SHIFT
OUT-PUT
m-BIT SHIFT
LATCH
SELECT

PRIORITY ENCODER
EXPONENT OPERATION
DECISION OF AMOUNT OF SHIFT OPERATION
MANTISSA BARREL SHIFTER
OUTPUT
OPERATION
OUTPUT
m
OUTPUT
OPERATION
SELECT
OUTPUT
SELECT

PRIORITY ENCODER AND FLOATING-POINT NORMALIZATION SYSTEM FOR IEEE 754 STANDARD

BACKGROUND OF THE INVENTION

1. Field of the Invention

The present invention relates to a priority encoder and a floating-point normalization system, more particularly to a priority encoder with a capability of comparing a difference of size among inputs and to a floating-point normalization system for IEEE 754 standard having a higher-operational efficiency.

2. Description of the Prior Art

Recently, it is more required to provide a LSI (Large Scale Integration) having a capability of the floating-point operation based on the IEEE 754 standard.

The IEEE 754 standard comprises a sign, an exponent, and a mantissa.

As an expression format thereof, a normalized number and a denormalized number are defined. For example, a 32-bit single normalized number is expressed as the following equation, in which it is assumed that an implicit leading significant bit is one (1):

$$\text{Normalized number} = (-1)^{*} \times (1.\text{ Mantissa}) \times 2^{(Exponent - 127)}$$

where the symbol "*" denotes a sign.

Hereinafter, the left end in the expression format of the exponent and the mantissa means the Most Significant Bit (MSB). The right end in the expression format of them indicates the Least Significant Bit (LSB).

On the other hand, in case where an absolute value of a number is smaller than a predetermined number, namely, when the value of the exponent of the number is zero (0) or when it is impossible to set the one (1) on the implicit leading significant bit, the number can be expressed by a denormalized number such as the following equation:

$$\text{Denormalized number} = (-1)^{*} \times (0.\text{ Mantissa}) \times 2^{(Exponent - 126)}$$

where the symbol "*" denotes a sign.

The floating-point calculator satisfying the IEEE 754 standard inputs numbers formed according to the IEEE 754 standard and outputs the result after converts into the IEEE 754 standard format.

FIG. 1 shows a block diagram according to a conventional floating-point normalization system. Referring to the drawings, the conventional normalization system will now be described.

To output a normalized number from the normalization system, a mantissa of an input number is given into a priority encoder 1, and then it is detected that where the first one (1) stands on observed from the MSB of the mantissa of the input number.

The mantissa of the input number is shifted toward the MSB in accordance with the output provided by the priority encoder 1 by using a left-direction barrel shifter 2 for arranging the format of the input number.

As a value obtained by shifting the mantissa of a number toward the MSB is equal to two times as large as the number, a substractor 3 is provided for the exponent in the normalization system. By this subtractor 3, the exponent is substracted by the number of shift of the mantissa transferred toward the MSB.

It seems to be shifted by one or more bit for the implicit leading significant bit. But usually calculators expand the implicit leading significant bit before the calculation. Accordingly, the mantissa can get rejecting the MSB of the number mentioned above.

When the number of exponent is less than the number of the shifting which is adequately required for normalization of the mantissa, the output of the normalization system is not a normalized number. In this case, a denormalized number defined by the IEEE 754 standard is outputted from the normalization system. Namely, the exponent of the normalized number is set to zero (0) after the mantissa is shifted toward the MSB by the number at which the exponent becomes zero (0).

Moreover, the mantissa is shifted toward the LSB by one (1) bit when the normalized number is outputted because the implicit leading significant bit is zero (0) in the denormalized number.

There is a problem that it takes much time to determine whether a number outputted from the conventional normalization system is a normalized number or not. Moreover, there is another problem that it is difficult to determine whether the output of the normalization system is a normalized number or not, before the normalized number is outputted from the normalization system. This determination can be achieved by seeing the exponent of the normalized number outputted from the conventional normalization system.

Accordingly, when the resultant value obtained by subtracting the output of the priority encoder 1 from the exponent is zero (0) or negative, an operation for the denormalized number is performed. The barrel shifter 2 for shifting the mantissa toward the MSB can be performed only after the subtraction of the exponent is finished.

While, each bit in the mantissa is checked by the priority encoder 1 for detecting the first position observed from the MSB in the format of the mantissa, so that it is difficult to make the priority encoder 1 fast.

Moreover, it is also difficult to execute speedy the subtractor 3 in which a propagation of carry is fast performed from the LSB to the MSB in the mantissa.

In the floating-point normalization system, the priority encoder 1 and subtractor 2 is used, so that it is difficult to increase the total operation speed of the normalization system.

As described above, there is the problem that it takes much time to determine whether an input number is able to be a normalized number or a denormalized number.

SUMMARY OF THE INVENTION

It is therefore an object of the present invention to provide a floating-point normalization system with a high operation speed rate and to provide a priority encoder as one of means to achieve it.

According to one aspect of the present invention there is provided a priority encoder comprising at least two input means for inputting data and an output means, each of which has a predetermined bit width. Namely, binary data based on the binary digit or binary information are inputted in at least one of the input means, and data or parallel information based on a predetermined order are inputted in other input means. Then a comparison operation between a binary number corresponding to a position of the first one (1) observed from the MSB end of the format of the parallel information and the binary number corresponding to the binary digit is performed, then the resultant smallest binary number in them is outputted through the output means.

According to another aspect of the present invention there is provided a floating-point normalization system comprising the priority encoder according to the one aspect of the present invention described above, a shift means for shifting the parallel information toward a predetermined direction by the number of shifting corresponding to the output as the smallest number outputted from the output means of the prior encoder, a one (1)-bit shift means for shifting the parallel information by at least one (1) bit toward the opposite direction of the predetermined direction, and a subtract means for subtracting between the output of the priority encoder and the binary input.

A mantissa as the parallel information and an exponent as the binary number of input data based on the IEEE 754 standard are inputted into the priority encoder.

In the floating-point normalization system with the priority encoder, a normalization operation is performed as following:

First, the mantissa of the input data based on the IEEE 754 standard is shifted by the number corresponding to the output of the priority encoder toward the MSB.

Next, the exponent is subtracted from the output of the priority encoder. This way, the normalization operation is performed.

When the output of the subtraction means is zero, namely, the input data is a denormalized number, the mantissa is shifted toward the LSB by one bits at the one-bit shift means or an one-bit shift circuit. Thereby, it is possible that the floating-point normalization system according to the invention can perform the operations of the subtract means and the barrel shifter at the same time. Moreover, the floating-point normalization system can be performed at a high speed rate.

According to another aspect of the present invention there is provided a floating-point normalization system in which data comprising an exponent comprising a first shift means to which a mantissa are inputted and in which at least the mantissa can be shifted to a predetermined direction, a second shift means to which the output of the first shift means is inputted and shifted by one (1) bit, a detecting means for detecting a position of the first one (1) or the first zero (0) in the mantissa, a subtraction means for subtraction of the exponent, a data-holding means for temporarily keeping the output of the second shift means, and a selection means for selecting one of a value in the second keeping means and the output of the first shift means corresponding to the result obtained by the subtraction means.

In the floating-point normalization system, first it is assumed that the output data becomes a denormalized number. Then, the barrel shifter is performed under the assumption and the output of the barrel shifter is kept into the holding means. Next, the floating-point normalization system is executed as the output data becomes a normalized number. Finally, when the output of the floating-point normalization system is normalized number, the output is given as an output of the normalization system. On the other hand, when the output of the floating point normalization system is not a normalized number, the data kept in the holding means is outputted. Thereby, the floating-point normalization system can be executed at a high speed.

These and other objects, feature and advantages of the present invention will be more apparent from the following description of a preferred embodiment, taken in conjunction with the accompanying drawing.

DETAILED DESCRIPTION OF THE PREFERRED EMBODIMENTS

The priority encoder and floating-point normalization system according to the present invention will be described with reference to the drawings.

Figure 2:
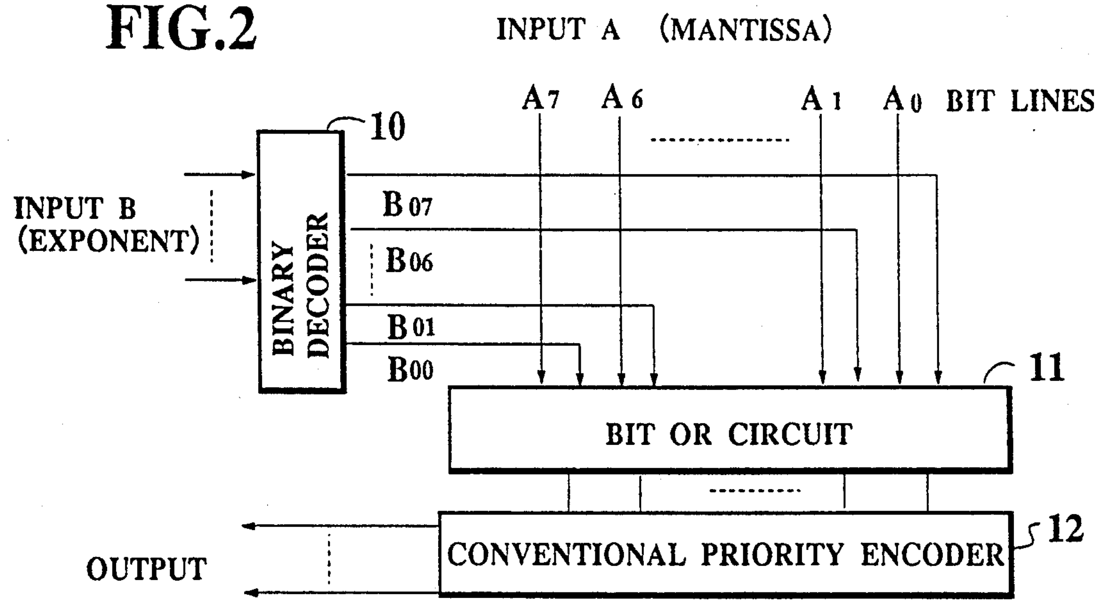
FIG. 2 is a block diagram of a priority encoder according to a first embodiment of the invention.

FIG. 2 is a block diagram of a priority encoder having a capability for comparison of size between inputs. In the same diagram, a numeral number 10 designates a binary decoder for inputting a binary data or a binary number as an input B based on the binary digit or a binary information (For example, an exponent of a floating-point number) and outputting a value as a parallel signal information corresponding to a position expressed by the first one (1) in a format of the binary number. A reference number 11 is a bit-OR means for calculating between each bit in the parallel signal information as the output of the binary decoder 10 and each bit of a parallel information as an input A. The reference number 12 denotes a priority encoder used conventionally.

Figure 3:
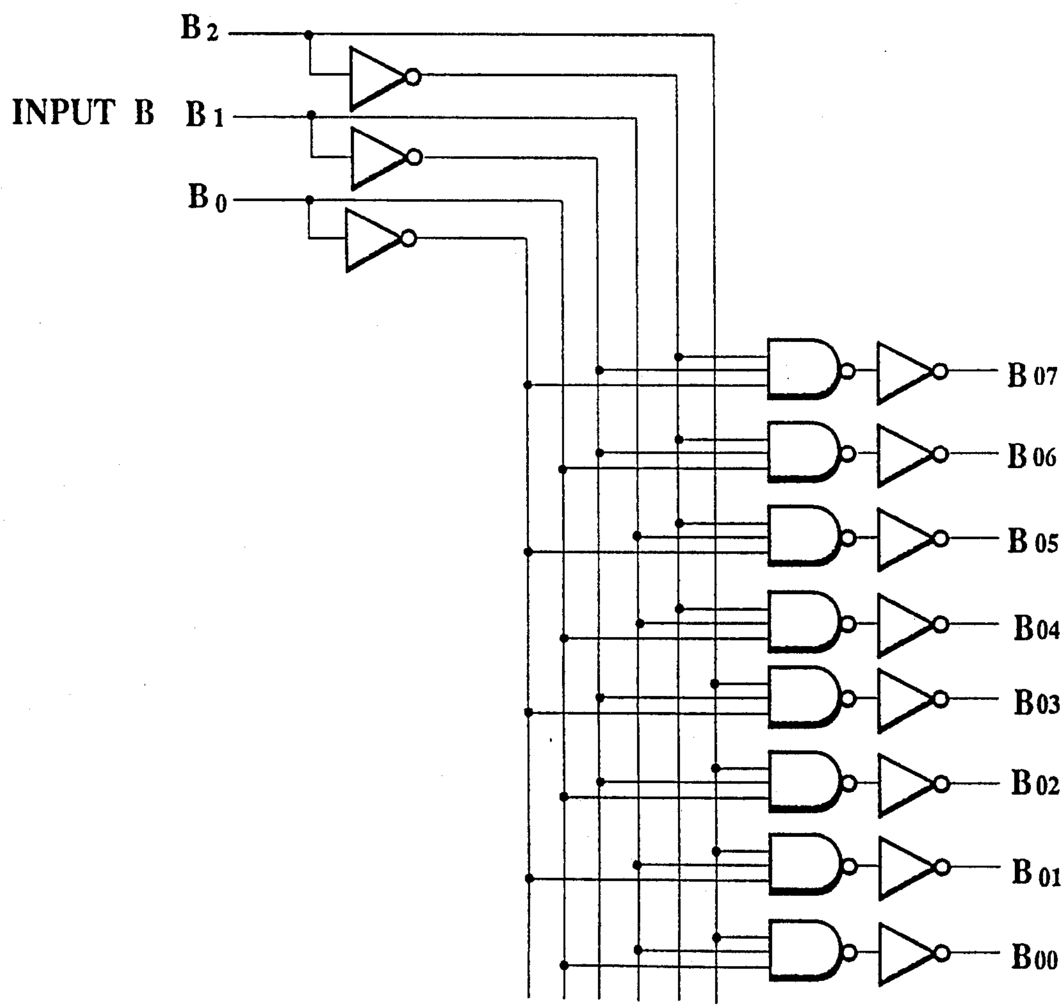
FIG. 3 is a specific circuit diagram of a binary decoder as one of compositional elements in the priority encoder as shown in FIG. 2.

FIG. 3 is a block diagram of an embodiment according to the binary decoder as shown in FIG. 2.

In the same diagram, reference characters B0, B1, and B2 are input signal lines for inputting the binary number (the input B), B00, B01, . . . , and B07 are output signal lines for the output of the binary decoder.

Figure 4:
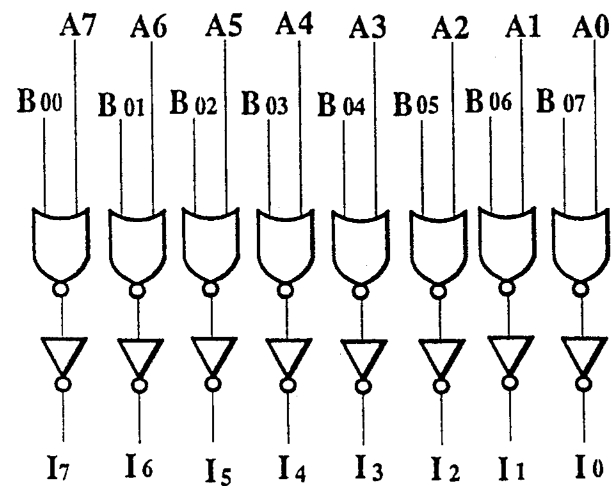
FIG. 4 is a specific circuit diagram of a bit-OR circuit as one of compositional elements in the priority encoder as shown in FIG. 1.

FIG. 4 is a block diagram according to an embodiment of the bit-OR circuit. In the same diagram, reference characters A0, A1, . . . , and A7 designate input signal lines of the input A. Reference characters B00, B01, . . . , and B07 denote input lines of the output of the binary decoder 10.

Figure 5:
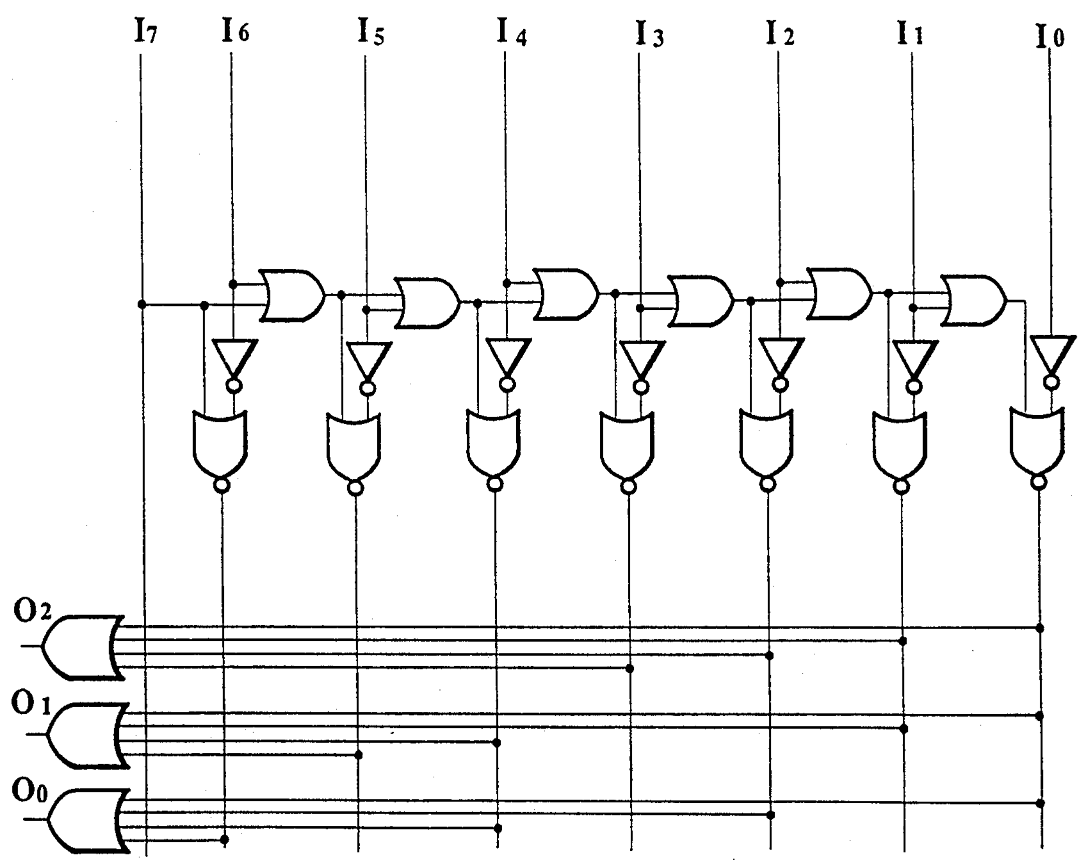
FIG. 5 is a circuit diagram of a priority encoder previously used.

FIG. 5 is a block diagram according to an embodiment of a priority encoder used conventionally. In the same diagram, reference characters I0, I1, . . . , and I7 designate input lines of the output of the bit-OR circuit. Reference characters Oo, O1, and O2 denote output lines of the conventional priority encoder.

The priority encoder of the embodiment according to the invention as shown in FIG. 2 inputs the binary number or the binary information as the input B other than the input A.

By comparing between the value expressed by the input B and a value corresponding to a bit arrangement obtained by a position of the first one (1) observed from the MSB of the format of the input A, which is an input of the conventional priority encoder, the smallest value of them is outputted from the bit-OR circuit 11.

An operation of the priority encoder having the composition above will now be described as following.

A binary number as the input B such as the exponent is inputted into the binary decoder 10, then the parallel signal information is outputted from the binary decoder 10.

A format of the parallel signal information as the output of the binary decoder 10 stands the number by the position corresponding to the binary number as the input of the exponent.

For example, when the exponent as the binary input B is expressed by '11', it is converted to an bit arrangement '00 . . . 100' as the parallel signal information having a predetermined bit width by the binary decoder 10.

Next, each element observed from the right end or the LSB (B00 as shown in FIGS. 2 and 3) of the bit arrangement is inputted in parallel to each input line seen from the left end or the MSB (B00 as show in FIG. 4) of the bit-OR circuit, respectively for the OR operation at the bit-OR circuit 11.

For example, when the first one (1) stands at the fourth position observed of the MSB in the input A, the input A is '0001 . . . ' and the parallel signal information as the output of the binary decoder 10 becomes '. . . 100', and the output of the bit-OR circuit 11 becomes '0011 . . . '. In this case, it is understood that the one (1) stands on the third position observed from the MSB in the output of the bit-OR circuit. Next, when the output of the bit-OR circuit 11 is inputted into the circuit what is called the conventional priority encoder 12, it is determined that the first one (1) stands on the third position observed from the left end (the MSB) of the output.

When a bit width of decoded input B is longer than that of the input A, the part of the longer bit length of the decoded input B is omitted.

In the conventional priority encoder, only a bit position "m" of the first one (1) in the format of the mantissa is outputted.

While, the priority encoder of the present embodiment has the capability for comparison of size between a resultant value "n" of the exponent converted by the binary decoder 10 and the mantissa "m" and is outputted the smallest value.

An embodiment of a floating-point normalization system having the priority encoder characterized above will now be described as following.

Figure 6:
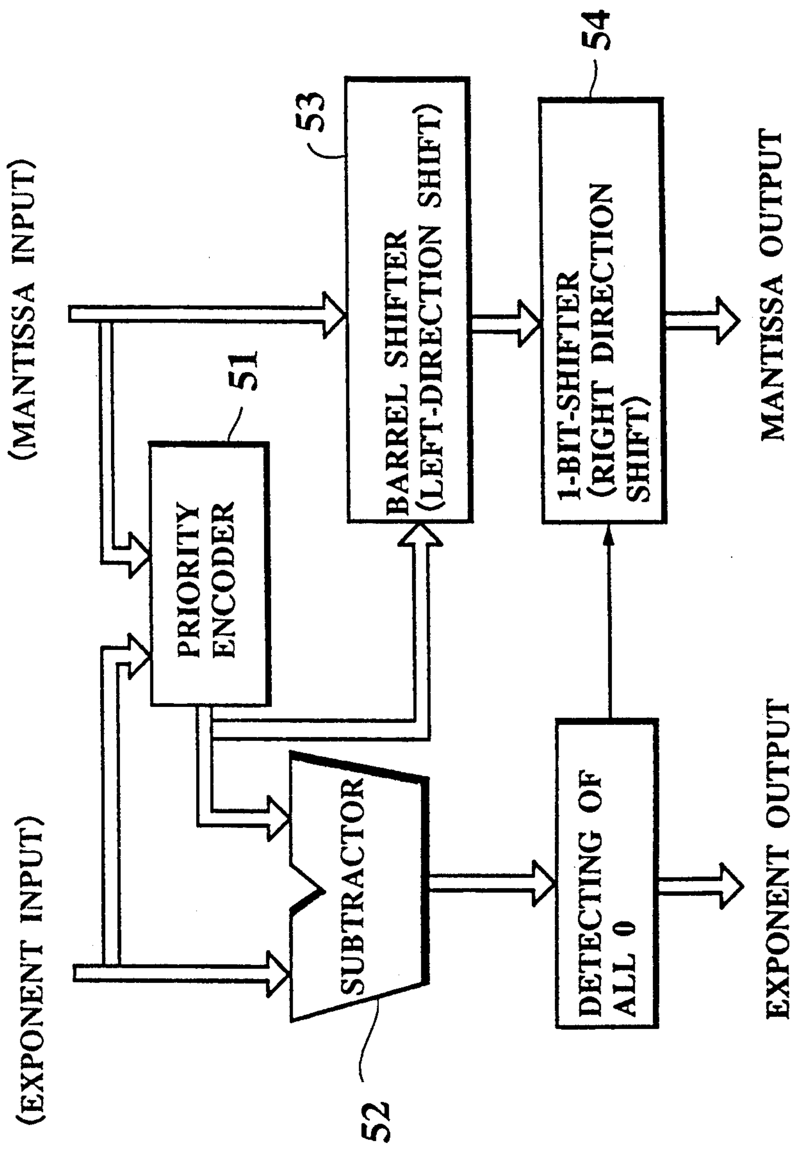
FIG. 6 is a block diagram of a floating-point normalization system according to the invention.

FIG. 6 shows the floating-point normalization system organization having the priority encoder 51 as shown in FIG. 2 according to an embodiment of the invention.

In the same diagram, the reference number 51 designates the priority encoder as shown in FIG. 2. The reference number 52 is a subtractor as a subtraction means, 53 denotes a barrel shifter as a shift means. The compositional elements (subtractor 52, barrel shifter 53, one-bit shifter 54, and etc.) excepting the priority encoder 51 are used in the conventional floating-point normalization system.

The mantissa and the output of the priority encoder 51 are inputted to the barrel shifter 53. Accordingly, the barrel shifter 51 is free from an output of the subtractor 52.

Next, an operation of the floating-point normalization system having the priority encoder 51 will be explained.

When the output of the normalization system is a normalized number, the number of shifting of the barrel shifter 53 becomes "m", when it is a denormalized number, the number of shifting of the barrel shifter 53 becomes "n−1".

On the other hand, the operational speed of the one-bit shifter 54 is relatively fast so that the one-bit shifter 54 can be executed separately against the barrel shifter 53. Accordingly, the number of shifting is "m" when the relation of "m" and "n" is $m<n$, the number of shifting is "n" when the relation of "m" and "n" is $m>n$.

Moreover, the output of the priority encoder 51 can be directly inputted to the barrel shifter 53 as shown in FIG. 6.

In addition, the exponential portion is n-m when the output of the normalization system becomes a normalized number, it is zero (0) when the output of the normalization system becomes a denormalized number. Therefore the exponential portion of the normalized number can be obtained by subtracting "n" from the output of the priority encoder 51.

This way, in the floating-point normalization system having the priority encoder as shown in FIG. 2, the barrel shifter 53 of the mantissa and the subtractor 52 of the exponent are executed at the same time.

Accordingly, the floating-point normalization system can be operated at a high speed.

The operation speed of the priority encoder 51 is relatively slow than that of the conventional priority encoder. The difference of the operation speed between them is caused only by the binary decoder 10 and the bit-OR circuit 11.

FIG. 3 shows a specific circuit diagram of the binary decoder 10 in the priority encoder 51. FIG. 4 shows a specific circuit diagram of the bit-OR circuit 11 in the priority encoder 51. Thus, the input A and the input B of the priority encoder of this embodiment according to the invention are executed separately every bit line B00 to B07, and A0 to A7 at the same time. Moreover, each bit element can be formed by a few gates.

Accordingly, the floating-point normalization system can be operated at a high speed by that the binary number as the binary information of the exponent is inputted as one input of the priority encoder and the mantissa is inputted as the other input which is a normal input in the conventional priority encoder according to the prior art.

Moreover, the exponent as the binary number is decoded by the binary decoder 10 in the prior encoder 51, so that the operation of the exponent become the main cause of delay in entire operation.

However, the exponent is earlier inputted into the floating-point normalization system than the mantissa. Thereby, the floating-point normalization system can be faster executed.

For example, in a floating-point normalization system in the pipeline system, where one stage is given for the normalization of the output data, the operation of the binary decoder 10 is given as a pre-stage and the output of the binary decoder 10 is stored temporarily in a store means, for example, a flipflop circuit. Thereby, the operation of the normalization system can be executed rapidly.

Figure 11:
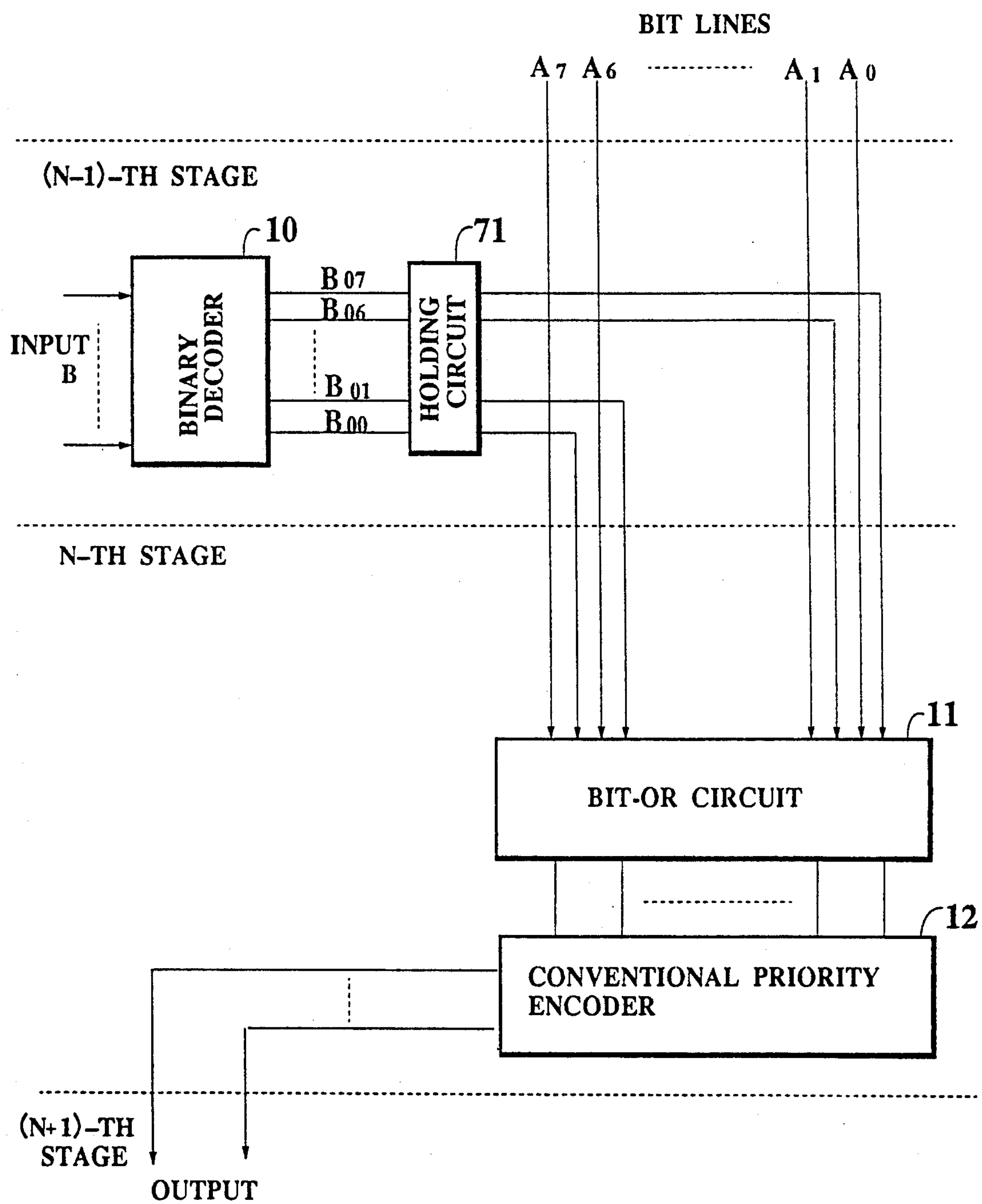
FIG. 11 is a block diagram of the priority encoder with a holding means according to another embodiment of the invention.

FIG. 11 shows a block diagram of the priority encoder having a holding circuit 71 as a store means such as a flipflop circuit for storing the operational result of the binary decoder 10.

At the (N−1)-th stage in the same diagram, the operational result of the binary decoder 10 is stored temporarily to the holding circuit 71. At N-th stage, the floating-point normalization system may be executed.

Figure 12A:
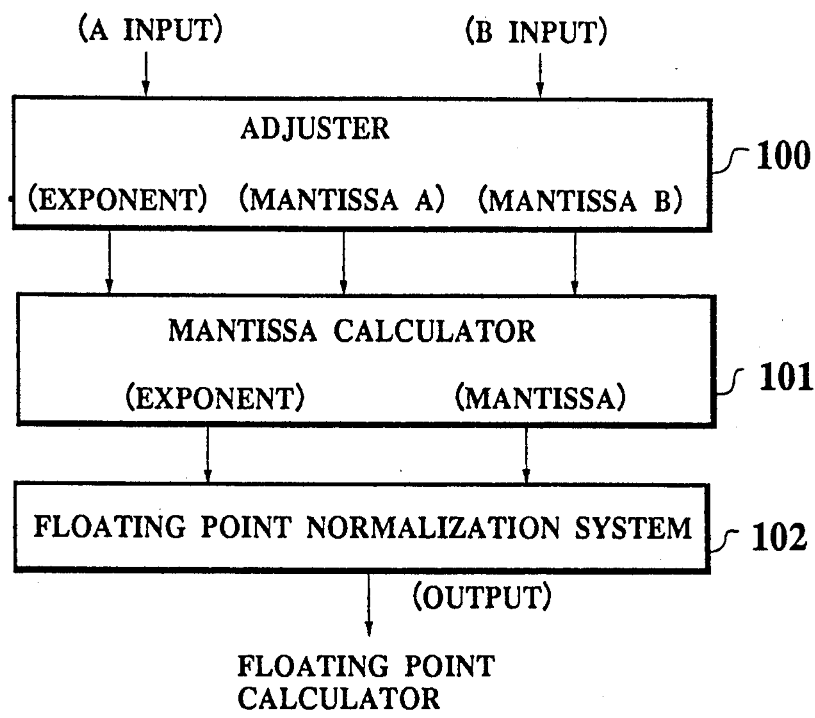
FIGS. 12A and 12B are block diagrams of a floating point normalization calculator with the floating-point normalization system and the floating-point normalization calculator of a pipe-line type.
Figure 12B:
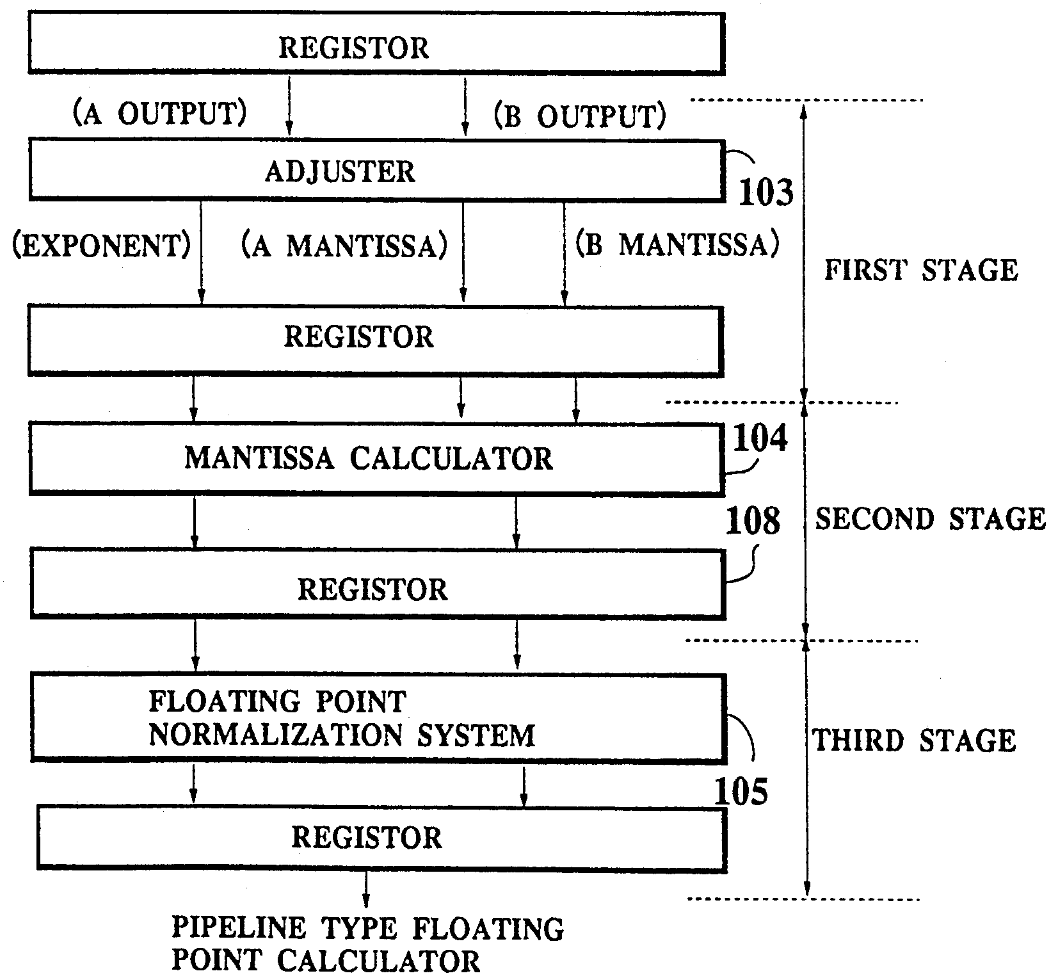

Namely, in the second stage in FIG. 12B (see the (n−1)-th stage shown in FIG. 11), the operation of the binary decoder 10 and the operation for storing its result into the holding circuit 71 are executed at the same time.

In the third stage in FIG. 12B (see the N-th stage shown in FIG. 11), it is not required that the operation of the binary decoder 10 and the operation for storing its result into the holding circuit 71.

Accordingly, the floating-point normalization system can be executed at a high speed. Where a part of a register 108 as shown in FIG. 12B is used as the holding circuit 71 in FIG. 11.

Another embodiment of the floating-point normalization system according to the invention will now be described as following.

The normalization system in this embodiment, the floating-point normalization system can be executed efficiently without using priority encoder 51 according to the embodiment as shown in FIGS. 2 and 6.

Figure 7:
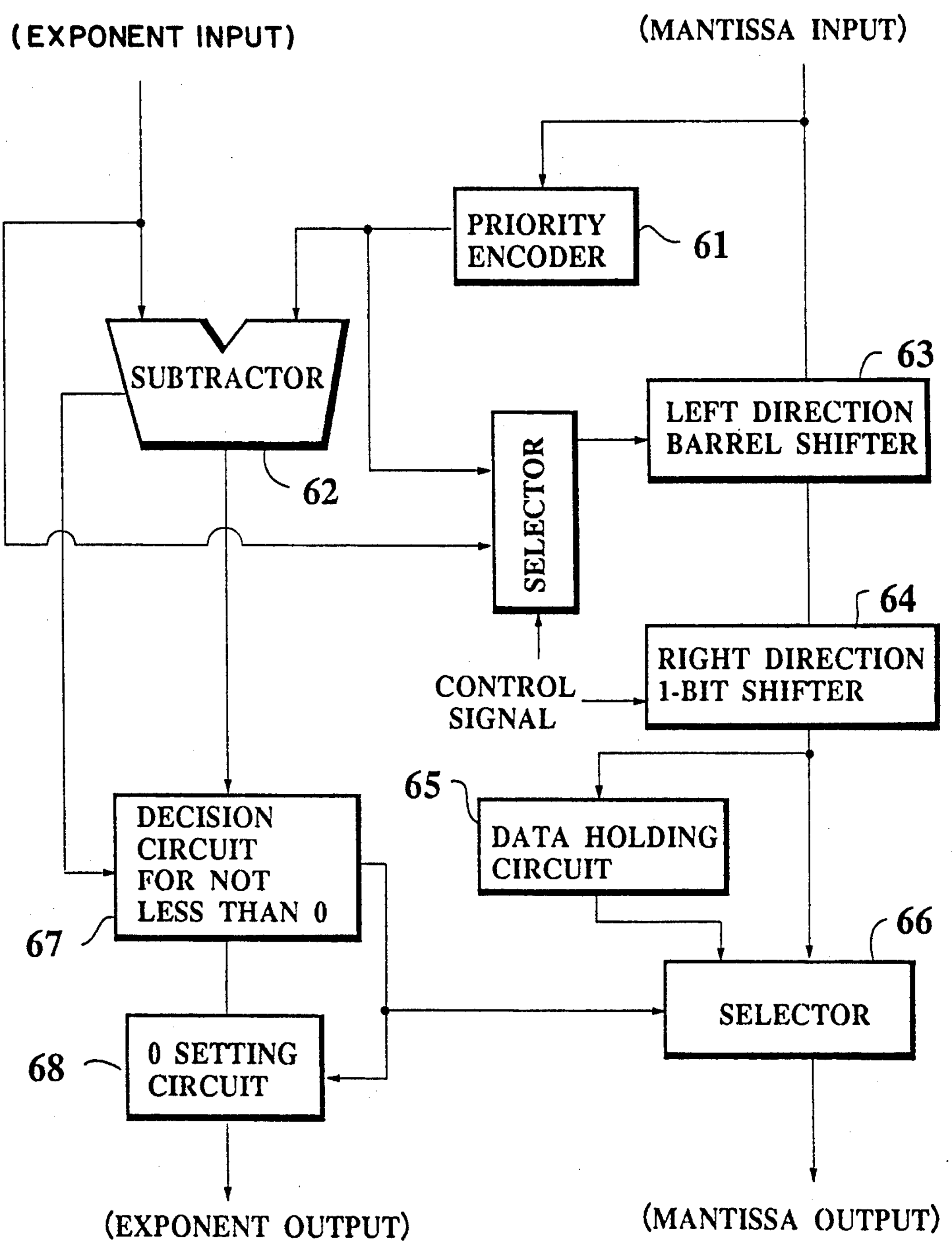
FIG. 7 is a block diagram of a floating-point normalization system according to an embodiment of the invention.

FIG. 7 shows a block diagram of the floating-point normalization system of the embodiment.

In the same diagram, a reference number 61 designates a priority encoder used conventionally, 62 denotes a subtractor, 63 is a barrel shifter as a shift means which can shift an input to the direction of the MSB of it. A reference number 64 designates an one-bit shifter which can shift an input to the direction of the LSB of it by one (1) bit.

A reference number 65 denotes a data holding circuit which comprises flip-flop circuits (F/F) for holding temporarily the output from the barrel shifter 63.

A reference number 66 indicates a selector as a select means which selects either the output of the holding circuit 66 or the output of the one-bit shifter 64 in accordance with an operation result of the subtractor 62.

Figure 8:
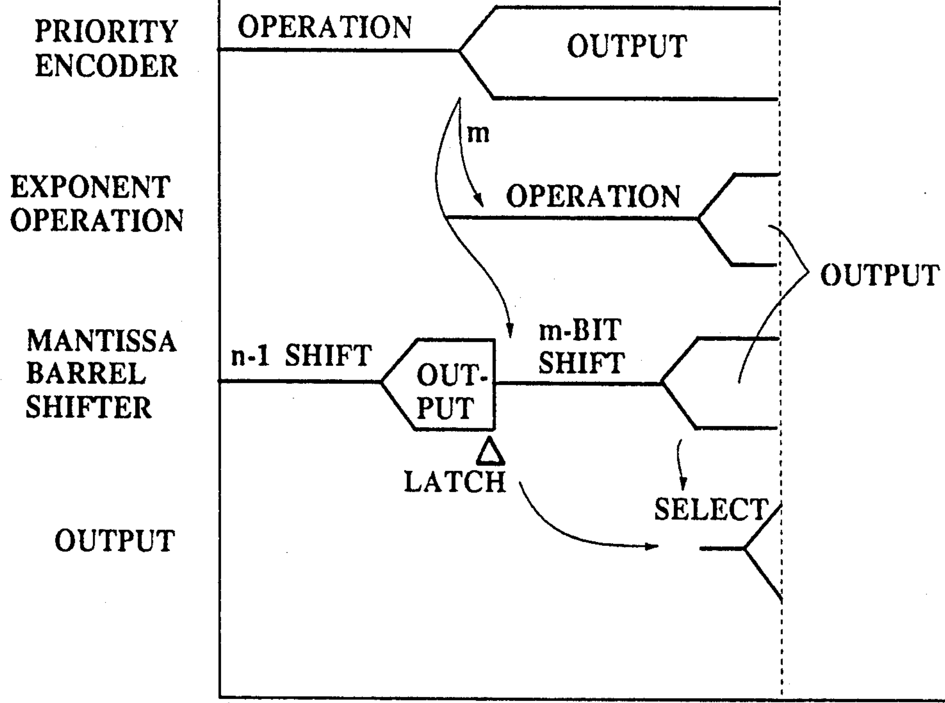
FIG. 8 is a timing chart showing an operation of the floating-point normalization system as shown in FIG. 7.

FIG. 8 is a timing chart showing the operation of the floating-point normalization system as shown in FIG. 7.

Figure 1:
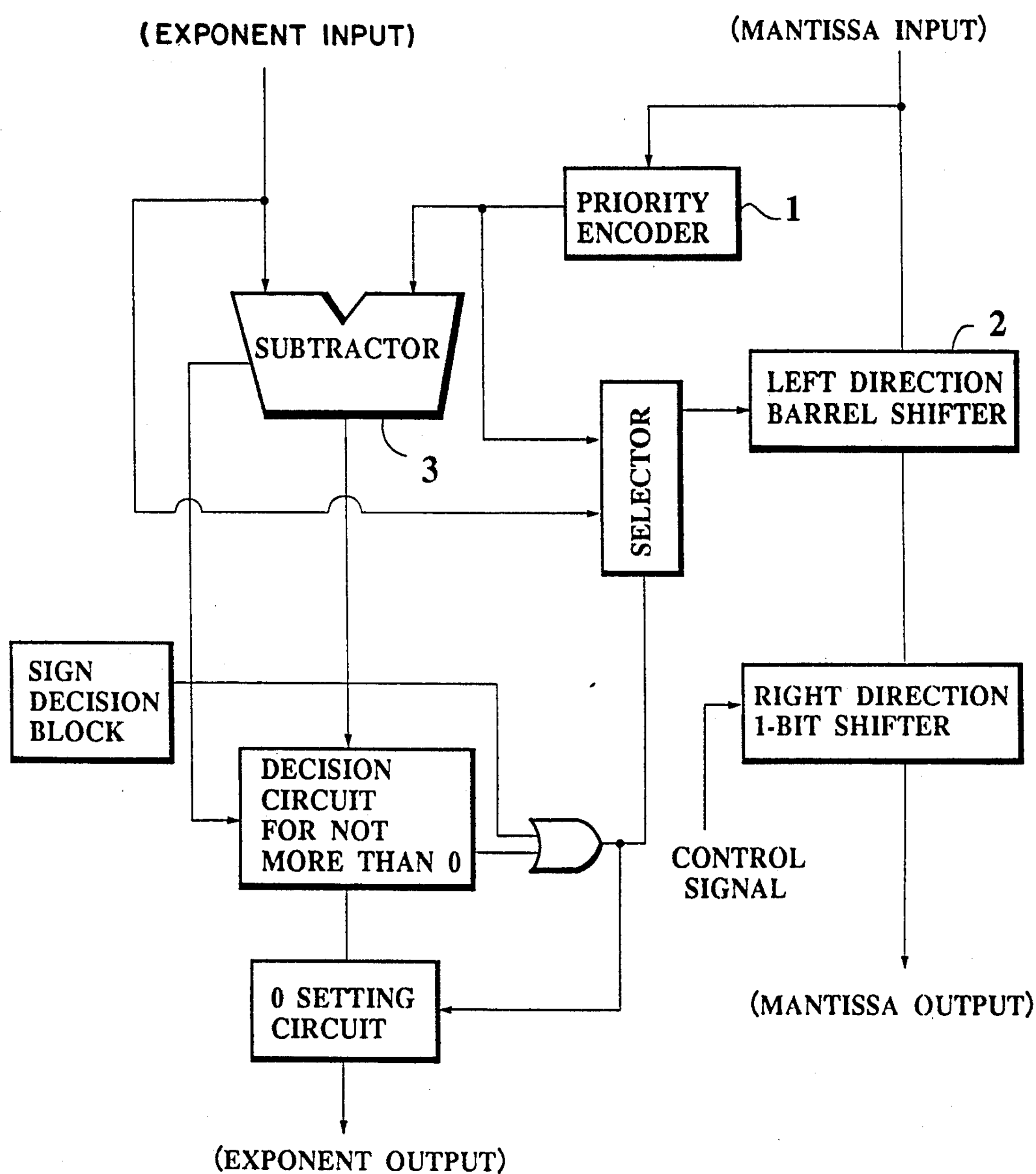
FIG. 1 is a block diagram according to a conventional floating-point normalization system.
Figure 9:
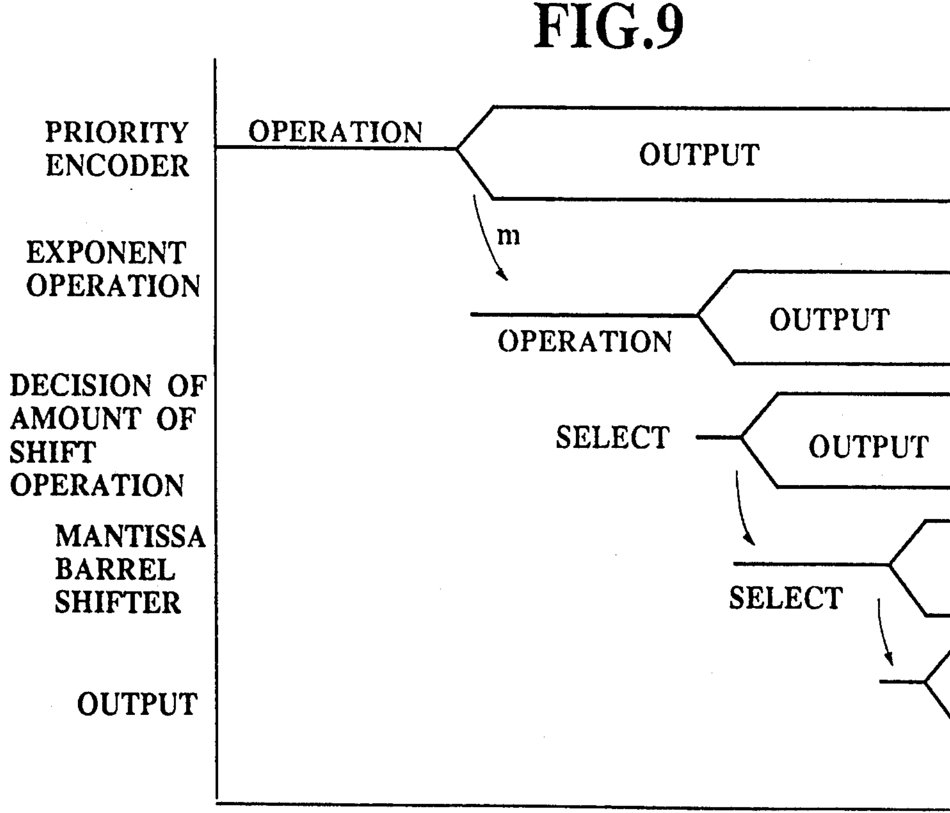
FIG. 9 is a timing chart showing an operation of the conventional floating normalization system as shown in FIG. 1.

FIG. 9 is a timing chart showing the operation of the conventional floating-point normalization system as shown in FIG. 1. Referring to these timing charts, the operation of the floating-point normalization system is explained as following.

When a bit position of the first one (1) observed from the MSB of the mantissa denotes "m" and a value of the exponent is "n", the mantissa should be shifted toward the MSB by the "m" bits for the output of a floating-point normalization system to be a normalized number.

On the other hand, when the mantissa should be shifted toward the left direction by the "n" bits for the output of a floating-point normalization system to be a denormalized number since the exponent should be zero (0).

However, there is a difference of $\times 2^1$ between the mantissa and the exponent in these expression format. In this case, the mantissa must be shifted by "n−1" bits.

Namely, to summarise the above described results, the number of shifting in the barrel shifter 63 of the floating point normalization system is "m" when the output of the floating-point normalization system becomes a normalized number, and "n−1" when the floating-point normalization system becomes a denormalized number.

While, the exponent is "n-m" when the output of the floating-point normalization system becomes a normalized number, and zero (0) when the output of the floating-point normalization system becomes a denormalized number. Namely, it is determined by the relation of size between n and m that the output of the floating-point normalization system becomes either a normalized number or a denormalized number.

When the relation between n and m is n>m, the output of the subtractor 62 becomes a positive, so that the output of the floating-point normalization system becomes a normalized number.

In the prior art, it is determined by the result of subtraction from a value "n" of the exponent to an output "m" of the prior encoder that whether the output of the floating-point normalization system becomes a normalized number or a denormalized number. it is difficult to determine the number of shifting of the mantissa by the barrel shifter before the subtraction operation at the subtractor is finished.

As shown in FIG. 9, the operation of the barrel shifter 63 can be executed only after the calculation of the exponent is finished.

The number of shifting of the barrel shifter 63 is either "n−1" or "m". In the floating-point normalization system of the embodiment, the operations of shifting of the "n−1" bits and the m bits can be performed at the same time by the left direction or the MSB barrel shifter 63 and the one-bit shifter 64 while the subtraction of the exponent is executed by the subtractor 62.

Next, the number of shifting either "n−1" bits or "m" bits is determined and selected by the selector 66 controlled by the resultant value of the operation of the exponent at the subtractor.

In general, the priority encoder is not a higher speed circuit because it must be determined at every bit whether more significant bit is setted in the mantissa or not. While the priority encoder is executing, the n−1 shifter can be performed. Accordingly, the barrel shifter 63 and the one-bit shifter 64 are able to be executed parallel with the priority encoder and the resultant value obtained by the one-bit shifter 64 is stored temporarily into the data holding circuit 65, so that the operation of the floating-point normalization system of the embodiment can be executed at a high speed by adding a few hardware. In addition, the floating-point normalization system has a small construction.

A system which can be shifted toward the right direction by at least one (1) bit for guard of overflow is installed in the floating-point normalization system.

Accordingly, as shown in FIG. 7, the barrel shifter 63, so as to shift the input data such as the mantissa toward the direction of the MSB and the one-bit shifter 64 in order to shift the output of the barrel shifter 63 to the direction of the LSB for an operation of the one (1) bits are provided in the floating-point normalization system.

Thereby, when the input data is given to the barrel shifter 63, the barrel shifter 63 can be performed immediately without waiting for the finishing of the subtract operation at the subtractor 62 (see the timing chart as shown in FIG. 8 according to the conventional floating-point normalization system).

In the prior art, the operations of the priority encoder, the exponent, the selector, and the barrel shifter are executed sequentially.

On the other hand, in the floating-point normalization system of the embodiment, the operation of the barrel shifter and the execution from the priority encoder to the subtractor are performed at the same time, so that the floating-point normalization system can be executed at a high speed.

Figure 10:
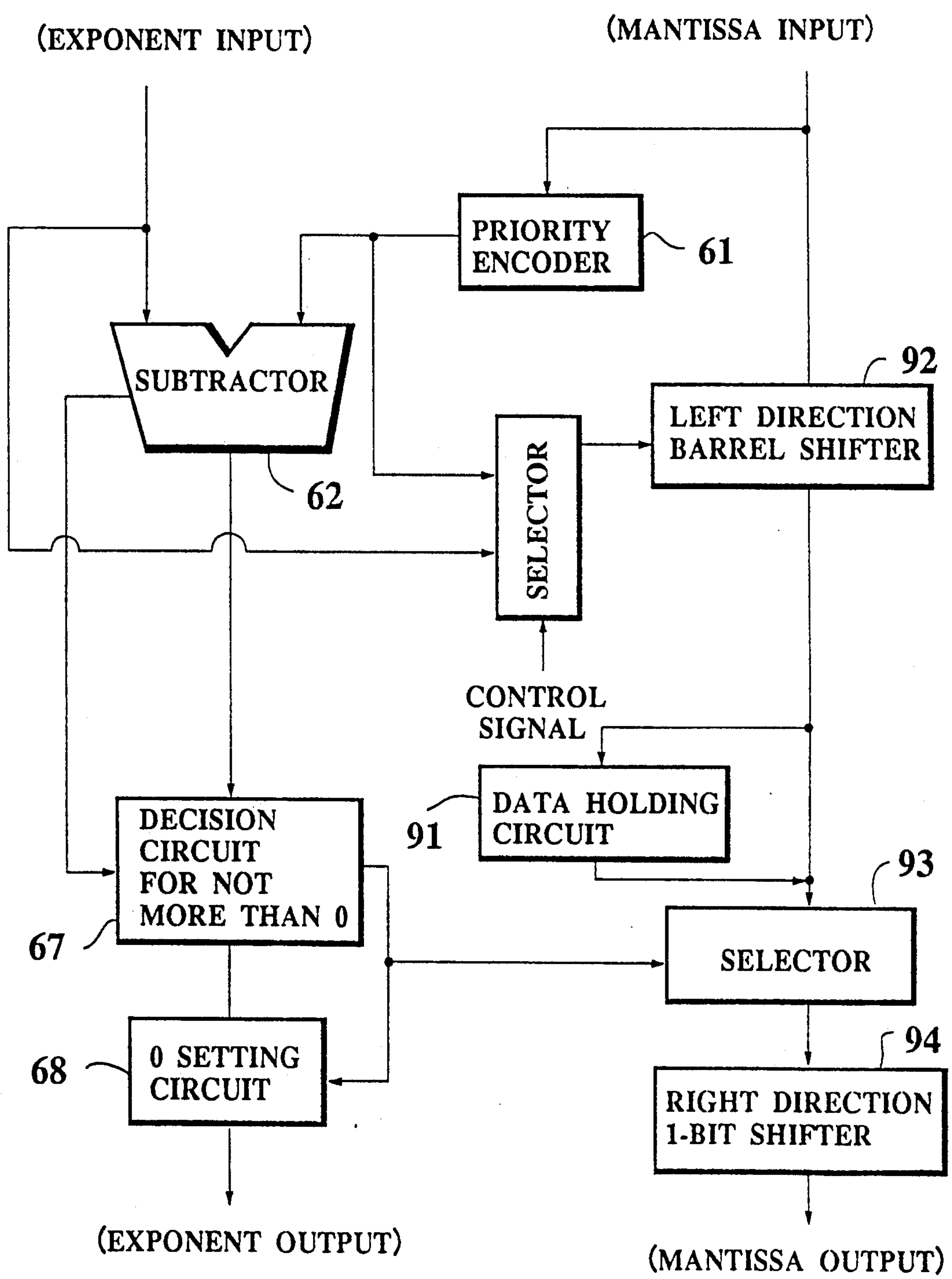
FIG. 10 is a block diagram of the floating-point normalization system according to another embodiment of the invention.

FIG. 10 shows a block diagram of another embodiment of the floating-point normalization system according to the invention. The difference between the embodiment as shown in FIG. 7 and the present embodiment is that the one bit shifter 94 is installed in the next to the selector 93. In the embodiment, the n-bit shifted value obtained by the barrel shifter 92 is stored into the data holding circuit 91.

The arrangement of other compositional elements excepting that of the one-bit shifter and the data holding circuit in the floating-point normalization system of the embodiment are equal to the compositional elements used in the embodiment as shown in FIG. 7.

Namely, in this embodiment, only the resultant value of operation of the n-bit shift at the barrel shifter 92 is stored into the data holding circuit 91 since the one-bit shifter 94 can be executed relatively at a high speed. When the mantissa is shifted to the LSB by one bit then the output of the floating-point normalization system becomes a denormalized number.

The floating-point normalization system having the above construction can be executed relatively faster at a higher speed than the conventional floating point normalization system.

Finally, a floating-point calculator having the priority encoder shown in FIG. 2 and the floating-point normalization system shown in FIGS. 6, 7, and 10 will now be described as following.

FIG. 12A shows a block diagram of an embodiment of the floating-point calculator. FIG. 12B is a block diagram of a floating-point calculator of a pipeline type. In these diagrams, operational results of blocks 100 and 101 as shown in FIG. 12A and a first stage (a block 103) and a second stage (a block 104) are converted into a predetermined form such as the IEEE 754 standard by the operation (third stage) of the floating-point normalization system according to the present invention.

The floating-point calculator has the floating-point normalization system in it, so that it can be executed at a higher speed rate than the conventional floating-point calculator.

Moreover, in the operation of the priority encoder, a positive-logic operation is used.

However, the present invention is not limited by the above described embodiment, for example, it should go without saying that a negative-logic operation in which one (1) and zero (0) are exchanged with zero (0) and one (1) may be used in the operation of the prior encoder.

Various modification will become possible for those skilled in the art after the teaching of the present disclosure without departing from the scope thereof.

What is claimed is:

1. A floating-point normalization system, comprising:

a priority encoder having first input means and second input means for inputting data, each of said input means having a predetermined bit width, the first input means inputting a first binary information based on a binary digit, the second input means inputting a parallel information having a predetermined order, and output means having said predetermined bit width, wherein the priority encoder executes a comparison operation between a first binary number corresponding to the first binary information and a second binary number corresponding to a position of a preceding "1" observed from the left end as a most significant bit in the format of the parallel information and the output means outputs the smallest binary number in the first binary number and the second binary number as an output of the priority encoder;

shift means for shifting the parallel information towards a predetermined direction by a shift number corresponding to the output of the priority encoder;

substration means for performing a subtract operation between the output of the priority encoder for and the binary information; and 1-bit shift means for shifting a shift output from the shift means by at least one bit in a direction opposite to the predetermined direction shifted by the shift means, wherein the subtraction means and the shift means are operated at the same time.

2. A floating-point normalization system according to claim 1, wherein the first input means inputs an exponent as the first binary information, the second input means inputs a mantissa as the parallel information; and the subtraction means executes the subtract operation between the exponent and the output of the priority encoder, and the mantissa as the shift output of the shift means is shifted based on the output of the priority encoder.

3. A floating-point normalization system to which data having an exponent part and a mantissa part is input, comprising:

a priority encoder for inputting the mantissa part and for detecting a position of a preceding first value of the mantissa part;

first selection means for selecting the exponent part and an output from the priority encoder;

first shift means for shifting the mantissa part by a value selected by the first selection means in a first direction;

holding means for shifting a first shifted output from of the first shift means in a direction which is opposite to the direction of the first direction by one bit and for holding the shifted output when the first selection means selects the exponent part;

subtraction means for subtracting the exponent part from the output of the priority encoder; and second selection means for selecting and outputting either the contents in the holding means or the first shifted output from the first shift means, whenever the first selection means selects the output from the priority encoder.

4. A floating-point normalization system according to claim 3, wherein the holding means further comprises a second shift means for shifting the first shifted output of the first shift means in a direction opposite to the direction of the first direction by one bit, whenever the first selection means selects the exponent part, and a holding means for temporarily holding a second shifted output provided by the second shift means;

5. A floating-point normalization system according to claim 3, wherein the first value is equal to one.

6. A floating-point normalization system according to claim 3, wherein the first value is equal to zero.

7. A floating-point normalization system to which data having an exponent part and a mantissa part is input, comprising:

a priority encoder for inputting the mantissa part and for detecting a position of a preceding first value of the mantissa part;

first selection means for selecting the exponent part and the output from the priority encoder;

first shift means for shifting in a first direction the mantissa part by a value selected by the first selection means;

holding means for temporarily holding a first shifted output provided by the first shift means whenever the first selection means selects the exponent part;

subtraction means for subtracting the exponent part from the output of the priority encoder;

second selection means for selecting either the contents in the holding means or the first shifted output from the first shift means whenever the first selection means selects the output from the priority encoder and for outputting the selected result; and second shift means for shifting a selected output from the second selection means in a direction opposite to the first direction by one bit whenever the first selection means selects the exponent part.

* * * * *